(12) United States Patent
Mizutani et al.

(10) Patent No.: US 6,759,001 B2
(45) Date of Patent: Jul. 6, 2004

(54) METHOD FOR PRODUCING EMBOSSED POLY(VINYL ALCOHOL) FILM

(75) Inventors: Tomoyoshi Mizutani, Ibaraki (JP); Syuichi Kitamura, Ibaraki (JP); Kenji Hasegawa, Osaka (JP); Manabu Miyato, Ogaki (JP); Hideki Oono, Ibaraki (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 464 days.

(21) Appl. No.: 09/859,283

(22) Filed: May 17, 2001

(65) Prior Publication Data

US 2002/0000164 A1 Jan. 3, 2002

(30) Foreign Application Priority Data

May 19, 2000 (JP) ........................................ 2000-147845
Mar. 16, 2001 (JP) ........................................ 2001-075205

(51) Int. Cl.[7] .......................... B29C 53/28; B29C 53/24; B29C 59/04
(52) U.S. Cl. ........................ 264/286; 264/505; 264/284; 264/293; 264/295; 264/339; 524/557; 428/174
(58) Field of Search ................................. 264/284, 293, 264/286, 295, 339, 505; 524/557; 428/174

(56) References Cited

U.S. PATENT DOCUMENTS

| | | | | |
|---|---|---|---|---|
| 3,427,298 A | * | 2/1969 | Tsuboi et al. ................ | 264/311 |
| 3,440,316 A | * | 4/1969 | Miyake et al. ............ | 264/235.6 |
| 3,585,177 A | * | 6/1971 | Gardner et al. ................ | 525/60 |
| 4,259,285 A | * | 3/1981 | Baumgartl et al. .......... | 264/284 |
| 4,913,858 A | * | 4/1990 | Miekka et al. ............. | 264/1.34 |
| 5,030,404 A | * | 7/1991 | Bonnebat et al. ........... | 264/185 |
| 6,063,239 A | | 5/2000 | Howland et al. ........... | 162/110 |
| 2002/0037946 A1 | * | 3/2002 | Isozaki et al. ............. | 523/128 |
| 2002/0182348 A1 | * | 12/2002 | Fujiwara et al. ........... | 428/35.2 |

FOREIGN PATENT DOCUMENTS

| | | | |
|---|---|---|---|
| GB | 1 443 071 A | 7/1976 | |
| JP | 63-125323 A * | 5/1988 | ........... B29C/55/02 |
| JP | 07-290567 | 11/1995 | |
| WO | WO 97/25476 A | 7/1997 | |

OTHER PUBLICATIONS

JPO English Abstract of JP–63–125323–A, Oct. 2003, Japanese Patent Office Website.*
JPO English Abstract and JPO Machine English Translation of JP–07–290567–A, Oct. 2003, Japanese Patent Office Website.*
Database WPI, Section Ch, Derwent Publications Ltd., London, GB, AN 1968–80532P (XP002172652 (1968)) [JP 42005348].
Database WPI, Section Ch, Derwent Publications Ltd., London, GB, AN 1968–80526P (XP002172653 (1968)) [JP 42005274].

* cited by examiner

Primary Examiner—Michael Colaianni
Assistant Examiner—Michael I. Poe
(74) Attorney, Agent, or Firm—Leydig, Voit & Mayer, Ltd.

(57) ABSTRACT

A method for producing an embossed PVA film, which includes embossing the film such that the crystallinity index of the emboss top is 0.50–0.90. The invention provides an embossed PVA film superior in resistance to blocking even when in a rolled state, in appearance to show the high quality of products, and in resistance to pinholes.

5 Claims, 1 Drawing Sheet

METHOD FOR PRODUCING EMBOSSED POLY(VINYL ALCOHOL) FILM

TECHNICAL FIELD OF THE INVENTION

The present invention relates to a method for producing an embossed poly(vinyl alcohol) (hereinafter to be referred to as PVA) film. More particularly, this invention relates to a method for producing an embossed PVA film superior in appearance, resistance to blocking and resistance to pinholes.

BACKGROUND OF THE INVENTION

Conventionally, a packaging material using a PVA film has been widely used as a material for containing agricultural chemicals, medicines, dyes, detergents, fertilizers, cosmetics, sanitary products and the like. This packaging material is used for, for example, obtaining a solution of what is included in the container utilizing the water solubility of PVA, by directly casting the container into an aqueous medium to allow disintegration, dispersion or dissolution of the container, for the disposal of the packaging material opened when in use, by dumping the packaging material into water as it is, and for other purposes. However, because the PVA film absorbs moisture, the surface sometimes becomes sticky and tends to show blocking of film due to the adhesive property of the film in high humidity.

To prevent the blocking property, films are generally embossed. For example, an embossed water soluble film has been proposed, which has a thickness of a concave part of 15–25 μm, and a tensile strength of the film of 2.5–4.5 kg/mm$^2$ (JP-A-7-290567).

While the above-mentioned film shows improved dispersibility and dissolution in water, mechanical strength and the like, it is otherwise with regard to resistance to blocking, appearance to impart an impression of high quality, resistance to pinholes and the like and these aspects have not been considered sufficiently.

As to the resistance to blocking, it is a general practice to evaluate same by applying a pressure to a film and measuring the blocking property of the film. When the film is in an actual mode of use, namely, when the film has been wound in a roll when the evaluation of the blocking property is performed, the evaluation becomes closer to an actual level evaluation and requires severer resistance to blocking than it does for the evaluation of the above-mentioned film.

As to the resistance to pinholes, conventional embossing is done by passing a film between an emboss roll and a backup roll. An embossed film is subject to the occurrence of pinholes. When a paste or liquid substance is contained, it may ooze out or leak out. Thus, a further improvement is desired.

It is therefore an object of the present invention to provide a method for producing an embossed PVA film superior in appearance and resistance to pinholes, which is capable of improving resistance to blocking and retaining resistance to blocking even if stored in a roll state.

SUMMARY OF THE INVENTION

The present invention therefore provides a method for producing an embossed PVA film, which comprises embossing a PVA film in such a manner that makes a crystallinity index at the emboss top fall within the range of 0.50–0.90.

Furthermore, when the ratio of the apparent film thickness (T μm) after embossing to the film thickness (t μm) before embossing (T/t; hereinafter sometimes to be referred to as degree of embossing) is 1.5–5, the action and effect of the present invention become more striking.

When the above-mentioned embossed PVA film is produced, a PVA resin having a viscosity in a 4 wt % aqueous solution of 5–40 mPa·s (20° C.) and a saponification degree of 70–99 mol % is used, or a PVA film is passed between an emboss roll and a backup roll for embossing, or a backup roll satisfying the conditions of a surface hardness (as measured by the method according to JIS K 6301) of A50-A95 and/or a surface hardness (as measured by the method according to JIS K 6253) of D60-D90 is used, or a moisture content of the PVA film is adjusted to 4–15 wt %, hereby the objective film can be preferably produced.

DETAILED DESCRIPTION OF THE INVENTION

Figure 1:
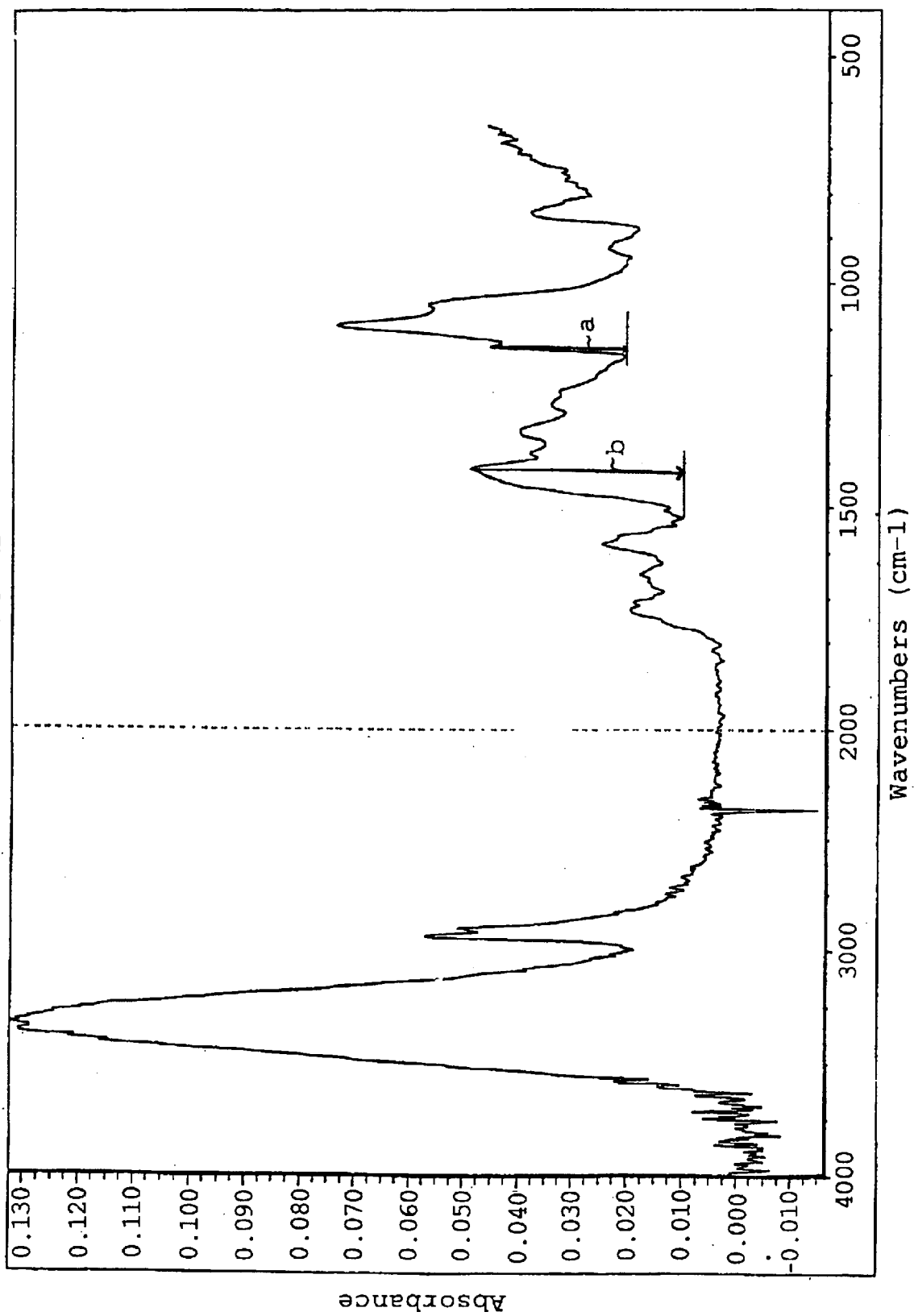
FIG. 1 shows a chart of infrared absorption spectrum of an embossed PVA film obtained by the method of the present invention.

A PVA resin, which is the starting material of the PVA film to be used in the present invention, can be produced by a known method without any particular limitation. That is, a vinyl ester compound is polymerized to give a vinyl ester polymer and the obtained polymer is saponified to give the PVA resin.

Examples of the vinyl ester compound include vinyl formate, vinyl acetate, vinyl trifluoroacetate, vinyl propionate, vinyl lactate, vinyl caprate, vinyl laurate, vinyl versatate, vinyl palmitate, vinyl stearate and the like, which are used alone or in combination, with practical preference given to vinyl acetate.

In the present invention, other monomers may be copolymerized as long as the object of the present invention is not impaired. Examples of the monomer include olefins such as ethylene, propylene, isobutylene, α-octene, α-dodecene, α-octadecene and the like; unsaturated acids such as acrylic acid, methacrylic acid, crotonic acid, maleic acid, maleic anhydride, itaconic acid and the like, salts thereof, mono- or dialkyl ester thereof and the like; nitrites such as acrylonitrile, methacrylonitrile and the like; amides such as acrylamide, methacrylamide and the like; olefinsulfonic acid such as ethylenesulfonic acid, allylsulfonic acid, methallylsulfonic acid and the like and salts thereof; alkyl vinyl ethers; N-acrylamidemethyltrimethylammonium chloride; allyltrimethylammonium chloride; dimethyldiallylammonium chloride; dimethylallyl vinyl ketone; N-vinylpyrrolidone; vinyl chloride; vinylidene chloride; polyoxyalkylene (meth)allyl ethers such as polyoxyethylene (meth)allyl ether, polyoxypropylene (meth)allyl ether and the like; polyoxyalkylene (meth)acrylates such as polyoxyethylene (meth)acrylate, polyoxypropylene (meth)acrylate and the like; polyoxyalkylene (meth)acrylamides such as polyoxyethylene (meth)acrylamide, polyoxypropylene (meth)acrylamide and the like; polyoxyethylene (1-(meth)acrylamide-1,1-dimethylpropyl) ester; polyoxyethylene vinyl ether; polyoxypropylene vinyl ether; polyoxyethylene allylamine; polyoxypropylene allylamine; polyoxyethylene vinylamine; polyoxypropylene vinylamine; and the like.

The polymerization (or copolymerization) is not subject to any particular limitation and a known polymerization method can be used. In general, solution polymerization is employed, which uses alcohol as a solvent, such as methanol, ethanol, isopropyl alcohol and the like. In addition, emulsion polymerization and suspension polymerization may be used.

The polymerization is carried out using a known radical polymerization catalyst such as azobisisobutyronitrile, acetyl peroxide, benzoyl peroxide, lauroyl peroxide and the like, wherein the reaction temperature is from 35° C. to about the boiling point of the solvent used. The lower limit of the reaction temperature is preferably 40° C., more preferably 50° C., and the upper limit is preferably 80° C.

The obtained vinyl ester polymer (inclusive of copolymer) can be saponified by dissolving the polymer in alcohol and reacting the polymer in the presence of a saponification catalyst. As the alcohol, exemplified are methanol, ethanol, butanol and the like. The concentration of the polymer in alcohol is 20–50 wt %.

Examples of the saponification catalyst include alkali catalysts such as hydroxides and alcoholates of alkali metal (e.g., sodium hydroxide, potassium hydroxide, sodium methylate, sodium ethylate, potassium methylate and the like). The catalyst is used in an amount of 1–100 mmol equivalent relative to a vinyl ester polymer. It is also possible, in some cases, to saponify using an acidic catalyst.

The thus-obtained PVA resin preferably provides a viscosity in a 4 wt % aqueous solution of 5–40 mPa·s (20° C.). When the viscosity in a 4 wt % aqueous solution is less than 5 mPa·s (20° C.), the mechanical strength of the obtained PVA film may become lower, and the crystallinity index of the emboss top tends to be too low, whereas when it exceeds 40 mPa·s (20° C.), the solubility of the film in water becomes lower, which in turn makes a fine aqueous solution of PVA resin difficult to be obtained during film forming. Even if the film is obtained, the obtained embossed film tends to have a lower water solubility or a higher crystallinity index of the emboss top, which is not preferable. The lower limit of the viscosity is preferably 6 mPa·s (20° C.), more preferably 7 mPa·s (20° C.), particularly preferably 10 mPa·s (20° C.), most preferably 11 mPa·s (20° C.). On the other hand, the upper limit is preferably 37 mPa·s (20° C.), more preferably 35 mPa·s (20° C.).

The viscosity in a 4 wt % aqueous solution here is measured according to the falling ball viscometer method described in the 1994 version of JIS K 6726 3.11.2.

The average polymerization degree of PVA resin is 300-4000, preferably 500-3000. When the average polymerization degree is less than 300, the film has lower strength, and when it exceeds 4000, the film forming property is degraded, which is not preferable.

The average polymerization degree here is measured according to the method using an Ostwald viscometer described in the 1994 version of JIS K 6726 3.7.

The PVA resin preferably has a saponification degree of 70–99 mol %. When the saponification degree is less than 70 mol % or above 99 mol %, the PVA resin dissolves less in water, which is not preferable for the same reasons as mentioned above. When the saponification degree is less than 70 mol %, the crystallinity index of the emboss top tends to become too low, whereas when it exceeds 99 mol %, the crystallinity index of the emboss top tends to become too high, which is not preferable. The lower limit of the saponification degree is more preferably 75 mol %, most preferably 80 mol %, and the upper limit is more preferably 98 mol %, most preferably 97 mol %.

The saponification degree here is measured according to the method described in the 1994 version of JIS K 6726 3.5.

Particularly, the PVA resin of the present invention preferably has a viscosity in a 4 wt % aqueous solution, which is within the above-mentioned preferable range, and a saponification degree within the above-mentioned preferable range.

Production (film forming) of a PVA film from the above-mentioned PVA resin is not subject to any particular limitation. For example, this resin is prepared into an aqueous solution and cast on a smooth metal surface such as a roll, a drum, an endless belt and the like, or water and/or the plasticizer to be mentioned later is added as appropriate to the resin and melt formed by extrusion method and the like, or other method is used to give a plain PVA film.

When producing as mentioned above, a plasticizer (glycerol, diglycerol, triethylene glycol, polyethylene glycol, polypropylene glycol and the like), a releasing agent (sorbitane ester ether and the like), an anti-cratering agent (polyoxyethylene alkylphenyl ether and the like), an antioxidant (phenol, amine and the like), a stabilizer (phosphates and the like), a surfactant (polyoxyethylene nonylphenyl ether, polyoxyethylene octylnonyl ether, polyoxyethylene dodecylphenyl ether, polyoxyethylene alkylallyl ether, polyoxyethylene sorbitane monolaurate, polyoxyethylene sorbitane monopalmitate, polyoxyethylene sorbitane monostearate, polyoxyethylene sorbitane monooleate, polyoxyalkylene alkyl ether phosphate monoethanolamine salt, polyoxyethylene alkylamino ether such as polyoxyethylene laurylamino ether, polyoxyethylene stearylamino ether etc., and the like), a coloring agent, flavor, extender, an antifoaming agent, an anti-rust agent, a W absorber, an inorganic powder, other water soluble polymer (sodium polyacrylate, polyethylene oxide, polyvinylpyrrolidone, dextrin, chitosan, chitin, methylcellulose, hydroxyethylcellulose, starch and the like) and the like may be added to the resin and an aqueous solution as necessary.

Where necessary, two or more kinds of the PVA resins can be mixed for use.

The thickness of the PVA film is not subject to any particular limitation, but it is preferably 5–80 $\mu$m. When the film thickness is less than 5 $\mu$m, the mechanical strength becomes insufficient, and when it exceeds 80 $\mu$m, dissolution property and film forming efficiency become unpreferably degraded. The lower limit of the film thickness is preferably 7 $\mu$m, more preferably 8 $\mu$m, particularly preferably 10 $\mu$m, and most preferably 15 $\mu$m. On the other hand, the upper limit is preferably 70 $\mu$m, more preferably 65 $\mu$m, and particularly preferably 60 $\mu$m.

The present invention is primarily characterized by embossing the above-mentioned PVA film in such a manner that can make the crystallinity index of the emboss top 0.50–0.90. When the crystallinity index is less than 0.50 or above 0.90, sufficient appearance, resistance to blocking or resistance to pinhole cannot be achieved, thus failing to meet the object of the present invention. Particularly, when it is less than 0.50, the resistance to blocking tends to be degraded but when it exceeds 0.90, the film easily develops pinholes. The preferable lower limit of the crystallinity index is 0.55, particularly 0.60, and the preferable upper limit is 0.85, particularly 0.80.

The crystallinity index here is an intensity ratio (a/b) of the peak intensity (a) of the absorption band near 1142 $cm^{-1}$, which is known as a crystallization band, to the peak intensity (b) of the absorption band near 1420 $cm^{-1}$, as calculated from the infrared absorption spectrum determined using Infrared Microspectroscopy with Attenuated Total Reflection (ATR) mode. For example, it can be measured using MAGNA 760 (infrared spectrophotometer) manufactured by Nicolet and 45 degree incidence of Ge (manufactured by Spectra-Tech Inc.) as an internal reflection element. When the intensity of the above-mentioned absorption band is read from the chart, each base line is drawn in parallel to the axis of abscissas (wavenumber axis) and the intensity of the peak is determined (see FIG. 1).

The above-mentioned emboss top, where the infrared absorption spectrum is measured, is the top of the film stamped by the convex of the emboss roll. From the aspect of the processed surface, it is a backup roll surface, and corresponds to the top of the convex of the emboss roll.

The method for controlling the crystallinity index is not particularly limited, and it can be controlled by adjusting the above-mentioned starting material PVA resin, and by appropriately adjusting embossing pressure, surface hardness of the backup roll, embossing speed (film speed during embossing), and the like, when embossing the PVA film.

The embossing is explained in detail in the following.

For embossing, an emboss roll and a backup roll are generally used. As the emboss roll, used is a metal roll, ceramic roll and the like having a surface processed in concave-convex shapes by engraving, lathe work and the like. The pattern of the convex may be a lattice, mesh (silk-like), tortoise shell, rhomboid and the like, as exemplified by a roll having a convex part of 10–200 mesh, preferably 20–100 mesh. When the convex part is less than 10 mesh, a film having fine concave-convex shapes cannot be obtained, and when it is more than 200 mesh, third dimensional embossing cannot be obtained.

As the backup roll, a roll satisfying the conditions of a surface hardness (JIS K 6301) of A50-A95 and/or a surface hardness (JIS K 6253) of D60-D90 is preferable, more preferably a roll having a surface hardness of A50-A95. When the hardness is less than A50, a sharp emboss pattern cannot be obtained, and when it exceeds D90, the film tends to have pinholes or get broken.

The lower limit of the surface hardness (JIS K 6301) is more preferably A55, particularly preferably A60, and the upper limit is preferably A90. The lower limit of the surface hardness (JIS K 6253) is more preferably D65, particularly preferably D70, and the upper limit is preferably D88, particularly preferably D85.

The surface hardness (JIS K 6301) here is measured according to the method described in JIS K 6301 using type A hardness tester. The surface hardness (JIS K 6253) is measured according to the method described in JIS K 6253 using type D hardness tester.

As the backup roll, a roll having the above-mentioned surface hardness is preferable. The kind thereof is not particularly limited and, for example, a metal roll, a resin roll, a paper roll, a cotton roll, a roll covered with synthetic rubber (e.g., urethane, silicone, fluoro, olefin etc.) (rubber roll) and the like, can be used. Of these, the use of a cotton roll and a rubber roll capable of producing a sharp emboss pattern with ease is preferable. In addition, the surface of the backup roll may be processed to give convex by engraving, lathe work and the like.

In the present invention, the above-mentioned PVA film is preferably passed between the above-mentioned emboss roll and backup roll for embossing. While the pressing force on the PVA film by the backup roll varies as appropriate depending applied to the surface hardness of the backup roll and the concave-convex shapes of the emboss roll to be used, it is generally preferably 10–100 kg/cm, more preferably 30–80 kg/cm.

When the pressing force is less than 10 kg/cm, emboss having a sufficient depth cannot be obtained, and when it exceeds 100 kg/cm, the emboss film has a partly small thickness, leading to an easy decrease in the mechanical strength and easy occurrence of pinholes, which is not preferable.

According to the present invention, the surface temperature of the emboss roll during embossing is preferably 80–180° C., and the surface temperature of the backup roll is preferably not less than 50° C. When the surface temperature of the emboss roll is less than 80° C., emboss having a sufficient depth cannot be obtained, and when it exceeds 180° C., the film shows lower dissolution property. When the surface temperature of the backup roll is less than 50° C., embossing having a sufficient depth cannot be obtained, which is not preferable.

The lower limit of the surface temperature of the emboss roll is preferably 85° C., more preferably 90° C., particularly Preferably 95° C., most preferably 100° C., particularly most preferably 105° C., most preferably 110° C., and particularly most preferably 115° C. On the other hand, the upper limit is preferably 170° C., more preferably 160° C., particularly preferably 150°, and most preferably 145° C.

The lower limit of the surface temperature of the backup roll is preferably 55° C., more preferably 60° C., particularly preferably 65° C., most preferably 70° C. On the other hand, the upper limit is preferably 120° C., more preferably 115° C., more preferably 110° C., particularly preferably 100° C., most preferably 95° C.

The running speed of the film during embossing varies depending on the thickness and the like of the film, but it is generally preferably 1–40 m/min. The lower limit of the speed of the film is preferably 3 m/min, more preferably 5 m/min. On the other hand, the upper limit is preferably 38 m/min, more preferably 35 m/min, more preferably 30 m/min.

The objective PVA film can be obtained by the above-mentioned embossing. The shape of the concave-convex of the emboss is not particularly limited and is appropriately determined. It is preferably a 10–200 mesh (preferably 20–100 mesh) pattern of lattice, silk-like mesh, tortoise shell, rhomboid and the like. The concave-convex shapes may be present on one surface or both surfaces.

In this way, a PVA film having an adjusted crystallinity index of the emboss top is obtained. According to the present invention, moreover, the degree of embossing of the film [ratio (T/t) of apparent thickness (T μm) of the film after embossing to that before embossing] is preferably 1.5–5. When the degree of embossing is less than 1.5, appearance and resistance to blocking cannot be improved further, and when it exceeds 5, resistance to pinhole is degraded. The lower limit of the degree of embossing is preferably 2, more preferably 3. On the other hand, the upper limit of the degree of embossing is preferably 4.5, more preferably 4.

The degree of embossing can be adjusted without any particular limitation by changing the film thickness before embossing or by adjusting the moisture content and the like of the film before embossing.

The moisture content of the film is preferably 4–15 wt %, more preferably 5–12 wt %, particularly 6–10 wt %. When the moisture content is less than 4 wt % or above 15 wt %, the degree of embossing of the obtained film cannot be increased, which is not preferable.

The moisture content of the PVA film can be controlled to fall within the above-mentioned range by continuously drying the PVA film after film forming, adjusting the humidity and the like, or by other method.

The thus-obtained embossed film is superior in resistance to blocking upon rolling for preservation, in appearance (free of shining of the film surface and imparting an impression of high quality), and in resistance to pinhole. This film is useful as a packaging material for agricultural chemicals, medicines, dyes, detergents, fertilizers, cosmetics, sanitary products and the like, particularly for unit packaging of various medicines and the like.

The present invention is explained in detail by referring to the examples. The present invention is not limited by these examples in any way.

In the examples, "%" is based on weight, unless specifically indicated otherwise.

The measurement methods and evaluation methods of the properties of the PVA resins and PVA films in the examples are shown in the following.

Viscosity in 4 wt % Aqueous Solution

The viscosity of PVA resin in a 4 wt % aqueous solution was measured according to the method described in the 1994 version of JIS K 6726 3.11.2.

Average Polymerization Degree

The average polymerization degree of PVA resin was measured according to the method described in the 1994 version of JIS K 6726 3.7.

Saponification Degree

The saponification degree of PVA resin was measured according to the method described in the 1994 version of JIS K 6726 3.5.

Crystallinity Index of Emboss Top

The crystallinity index of the emboss top of an embossed PVA film was determined by measuring the infrared absorption spectrum using MAGNA 760 (infrared spectrophotometer) manufactured by Nicolet and 45 degree incidence of Ge (manufactured by Spectra-Tech Inc.) as an internal reflection element according to Infrared Microspectroscopy with Attenuated Total Reflection (ATR) mode, and then reading the peak intensity (a) of the absorption band near 1142 $cm^{-1}$ and the peak intensity (b) of the absorption band near 1420 $cm^{-1}$, from the chart based on the base line drawn in parallel to the axis of abscissas (wavenumber axis), followed by calculation of a ratio (a/b).

Resistance to Blocking

An embossed PVA film (100 m) was wound up in a roll (bobbin diameter about 3 inch) at a tension of 3 kg/m, winding speed of 5 m/min, and the roll was left standing at room temperature for 2 weeks. The roll was unwound and evaluated as follows.

o . . . no blocking was observed and could be unwound smoothly to the core.
x . . . blocking was observed in the core and the film was partly broken during unwinding.

Appearance; Texture of the Film

An embossed PVA film was illuminated with an electric light diagonally from 45 degrees on the surface. The film was visually observed from the opposite side forming an angle of 45 degrees and evaluated as follows.

o . . . shining not observed
x . . . shining observed

Resistance to Pinhole

An embossed PVA film was placed on a filter, and a pinhole testing liquid (KISHIDA CHEMICAL CO, LTD., 0.1% Rhodamine B solution in methanol) was applied to the surface thereof with a brush. Whether or not the liquid leaked from the pinholes on the back was confirmed and evaluated as follows.

o . . . number of pinholes: none
Δ . . . number of pinholes: less than $4/m^2$
x . . . number of pinholes: 4 or above/$m^2$

EXAMPLE 1

A 25% aqueous solution of PVA resin [viscosity in 4 wt % aqueous solution: 22.5 mPa·s (20° C.) (average polymerization degree 1700), saponification degree: 88 mol %] was cast on a heat roll at 93° C. for film forming, and the moisture content was adjusted to 10% to give a PVA film having a thickness of 30 μm.

This film was passed between an emboss roll (carbon steel roll, surface: mesh (silk-like, 40 mesh)) heated to 120° C. and a backup roll (rubber roll, roll surface hardness: A80) heated to 80° C. at a pressing force of 50 kg/cm and a speed of 40 m/min for embossing in a 40 mesh (silk-like) pattern to give an embossed PVA film having an apparent film thickness of 70 μm (degree of embossing 2.3).

The crystallinity index of the emboss top of the obtained embossed film was measured by the above-mentioned method and found to be 0.67. The obtained embossed film was subjected to the above-mentioned evaluation.

EXAMPLE 2

In the same manner as in Example 1 except that a rubber roll having a roll surface hardness of A85 was used as the backup roll, an embossed PVA film having an apparent film thickness of 80 μm (degree of embossing 2.7) and a crystallinity index of the emboss top of 0.73 was obtained and subjected to the same evaluation.

EXAMPLE 3

In the same manner as in Example 1 except that a PVA resin having a viscosity in 4 wt % aqueous solution of 23.6 mPa·s (20° C.) (average polymerization degree 1700) and a saponification degree of 93 mol % and a rubber roll having a roll surface hardness of A75 were used, an embossed PVA film having an apparent film thickness of 80 μm (degree of embossing 2.7) and a crystallinity index of the emboss top of 0.77 was obtained and subjected to the same evaluation.

EXAMPLE 4

In the same manner as in Example 1 except that a PVA resin having a viscosity in 4 wt % aqueous solution of 10.2 mPa·s (20° C.) (average polymerization degree 1100) and a saponification degree of 88 mol % and a rubber roll having a roll surface hardness of A75 were used, an embossed PVA film having an apparent film thickness of 75 μm (degree of embossing 2.5) and a crystallinity index of the emboss top of 0.62 was obtained and subjected to the same evaluation.

COMPARATIVE EXAMPLE 1

In the same manner as in Example 1 except that a rubber roll having a roll surface hardness of A40 was used as the backup roll, an embossed PVA film having an apparent film thickness of 40 μm (degree of embossing 1.3) and a crystallinity index of the emboss top of 0.47 was obtained and subjected to the same evaluation.

EXAMPLE 5

A 25% aqueous solution of PVA resin [viscosity in 4 wt % aqueous solution: 30 mPa·s (20° C.), saponification degree: 88 mol %] was cast on a heat roll at 93° C. for film forming, and the moisture content was adjusted to 8% to give a PVA film having a thickness of 40 μm.

This film was passed between an emboss roll [carbon steel roll, surface: mesh (silk-like, 40 mesh)] heated to 130° C. and a backup roll (cotton roll, roll surface hardness: D85) heated to 110° C. at a pressing force of 50 kg/cm and a speed of 15 m/min for embossing in a 40 mesh (silk-like concave-convex) pattern to give an embossed PVA film having an apparent film thickness of 140 μm (degree of embossing 3.5).

The crystallinity index of the emboss top of the obtained embossed film was measured by the above-mentioned method and found to be 0.75. The obtained embossed film was subjected to the above-mentioned evaluation.

EXAMPLE 6

In the same manner as in Example 5 except that the surface temperature of the backup roll was changed to 100° C., an embossed PVA film having an apparent film thickness of 140 μm (degree of embossing 3.5) and a crystallinity index of the emboss top of 0.67 was obtained and subjected to the same evaluation.

EXAMPLE 7

In the same manner as in Example 5 except that the surface temperatures of the emboss roll and the backup roll were changed to 100° C. and 85° C., respectively, and the passing speed of the film was set for 5 m/min, an embossed PVA film having an apparent film thickness of 125 μm (degree of embossing 3.1) and a crystallinity index of the emboss top of 0.59 was obtained and subjected to the same evaluation.

EXAMPLE 8

In the same manner as in Example 5 except that a cotton roll having a roll surface hardness of D75 was used as the backup roll, an embossed PVA film having an apparent film thickness of 135 μm (degree of embossing 3.4) and a crystallinity index of the emboss top of 0.72 was obtained and subjected to the same evaluation.

EXAMPLE 9

In the same manner as in Example 5 except that a cotton roll having a roll surface hardness of D65 was used as the backup roll, an embossed PVA film having an apparent film thickness of 130 μm (degree of embossing 3.3) and a crystallinity index of the emboss top of 0.71 was obtained and subjected to the same evaluation.

EXAMPLE 10

In the same manner as in Example 5 except that the pressing force between the rolls was set for 70 kg/cm, an embossed PVA film having an apparent film thickness of 150 μm (degree of embossing 3.8) and a crystallinity index of the emboss top of 0.78 was obtained and subjected to the same evaluation.

EXAMPLE 11

In the same manner as in Example 5 except that the moisture content of the PVA film to be embossed was set for 4%, an embossed PVA film having an apparent film thickness of 130 μm (degree of embossing 3.3) and a crystallinity index of the emboss top of 0.68 was obtained and subjected to the same evaluation.

EXAMPLE 12

In the same manner as in Example 5 except that a PVA resin having a viscosity in 4 wt % aqueous solution of 15 mPa·s (20° C.) and a saponification degree of 95 mol % was used, an embossed PVA film having an apparent film thickness of 140 μm (degree of embossing 3.5) and a crystallinity index of the emboss top of 0.80 was obtained and subjected to the same evaluation.

EXAMPLE 13

In the same manner as in Example 5 except that a PVA resin having a viscosity in 4 wt % aqueous solution of 15 mPa·s (20° C.) and a saponification degree of 95 mol % was used and a moisture content of the PVA film to be embossed was set for 12%, an embossed PVA film having an apparent film thickness of 140 μm (degree of embossing 3.5) and a crystallinity index of the emboss top of 0.85 was obtained and subjected to the same evaluation.

COMPARATIVE EXAMPLE 2

In the same manner as in Example 5 except that a moisture content of the PVA film to be embossed was set for 3% and the surface temperatures of the emboss roll and the backup roll were changed to 100° C. and 70° C., respectively, an embossed PVA film having an apparent film thickness of 140 μm (degree of embossing 3.5) and a crystallinity index of the emboss top of 0.40 was obtained and subjected to the same evaluation.

COMPARATIVE EXAMPLE 3

In the same manner as in Example 5 except that a moisture content of the PVA film to be embossed was set for 3% and the surface temperatures of the emboss roll and the backup roll were changed to 200° C. and 150° C., respectively, an embossed PVA film having an apparent film thickness of 140 μm (degree of embossing 3.5) and a crystallinity index of the emboss top of 1.00 was obtained and subjected to the same evaluation.

EXAMPLE 14

A 25% aqueous solution of PVA resin [viscosity in 4 wt % aqueous solution: 30 mPa·s (20° C.), saponification degree: 88 mol %] was cast on a heat roll at 93° C. for film forming, and the moisture content was adjusted to 8% to give a PVA film having a thickness of 40 μm.

This film was passed between an emboss roll [carbon steel roll, surface: mesh (silk-like, 40 mesh)] heated to 130° C. and a backup roll (rubber roll, roll surface hardness: A75) heated to 110° C. at a pressing force of 50 kg/cm and a speed of 15 m/min for embossing in a 40 mesh (silk-like concave-convex) pattern to give an embossed PVA film having an apparent film thickness of 140 μm (degree of embossing 3.5).

The crystallinity index of the emboss top of the obtained embossed film was measured by the above-mentioned method and found to be 0.75. The obtained embossed film was subjected to the above-mentioned evaluation.

EXAMPLE 15

In the same manner as in Example 14 except that the surface temperatures of the emboss roll and the backup roll were changed to 90° C. and 120° C., respectively, an embossed PVA film having an apparent film thickness of 140 μm (degree of embossing 3.5) and a crystallinity index of the emboss top of 0.67 was obtained and subjected to the same evaluation.

EXAMPLE 16

In the same manner as in Example 14 except that the surface temperatures of the emboss roll and the backup roll were changed to 100° C. and 85° C., respectively, and the passing speed of the film was set for 5 m/min, an embossed PVA film having an apparent film thickness of 125 μm (degree of embossing 3.1) and a crystallinity index of the emboss top of 0.60 was obtained and subjected to the same evaluation.

EXAMPLE 17

In the same manner as in Example 14 except that a rubber roll having a roll surface hardness of A85 was used as the backup roll, an embossed PVA film having an apparent film thickness of 135 μm (degree of embossing 3.4) and a crystallinity index of the emboss top of 0.77 was obtained and subjected to the same evaluation.

EXAMPLE 18

In the same manner as in Example 14 except that a rubber roll having a roll surface hardness of A65 was used as the backup roll, an embossed PVA film having an apparent film thickness of 130 μm (degree of embossing 3.3) and a crystallinity index of the emboss top of 0.71 was obtained and subjected to the same evaluation.

EXAMPLE 19

In the same manner as in Example 14 except that a pressing force between rolls was set for 70 kg/cm, an embossed PVA film having an apparent film thickness of 150 μm (degree of embossing 3.8) and a crystallinity index of the emboss top of 0.78 was obtained and subjected to the same evaluation.

EXAMPLE 20

In the same manner as in Example 14 except that the moisture content of the PVA film to be embossed was set for 6%, an embossed PVA film having an apparent film thickness of 130 μm (degree of embossing 3.3) and a crystallinity index of the emboss top of 0.68 was obtained and subjected to the same evaluation.

EXAMPLE 21

In the same manner as in Example 14 except that a PVA resin having a viscosity in 4 wt % aqueous solution of 15 mPa·s (20° C.) and a saponification degree of 95 mol % was used, an embossed PVA film having an apparent film thickness of 140 μm (degree of embossing 3.5) and a crystallinity index of the emboss top of 0.80 was obtained and subjected to the same evaluation.

EXAMPLE 22

In the same manner as in Example 14 except that a PVA resin having a viscosity in 4 wt % aqueous solution of 15 mPa·s (20° C.) and a saponification degree of 95 mol % was used and the moisture content of the PVA film to be embossed was set for 10%, an embossed PVA film having an apparent film thickness of 140 μm (degree of embossing 3.5) and a crystallinity index of the emboss top of 0.85 was obtained and subjected to the same evaluation.

EXAMPLE 23

In the same manner as in Example 14 except that a cotton roll having a roll surface hardness of D85 was used as the backup roll, an embossed PVA film having an apparent film thickness of 140 μm (degree of embossing 3.5) and a crystallinity index of the emboss top of 0.79 was obtained and subjected to the same evaluation.

COMPARATIVE EXAMPLE 4

In the same manner as in Example 14 except that a moisture content of the PVA film to be embossed was set for 3% and the surface temperatures of the emboss roll and the backup roll were changed to 100° C. and 70° C., respectively, an embossed PVA film having an apparent film thickness of 140 μm (degree of embossing 3.5) and a crystallinity index of the emboss top of 0.40 was obtained and subjected to the same evaluation.

COMPARATIVE EXAMPLE 5

In the same manner as in Example 14 except that a moisture content of the PVA film to be embossed was set for 3% and the surface temperatures of the emboss roll and the backup roll were changed to 200° C. and 150° C., respectively, an embossed PVA film having an apparent film thickness of 150 μm (degree of embossing 3.8) and a crystallinity index of the emboss top of 1.00 was obtained and subjected to the same evaluation.

COMPARATIVE EXAMPLE 6

In the same manner as in Example 14 except that a rubber roll having a roll surface hardness of A40 was used as the backup roll, an embossed PVA film having an apparent film thickness of 65 μm (degree of embossing 1.6) and a crystallinity index of the emboss top of 0.42 was obtained and subjected to the same evaluation.

COMPARATIVE EXAMPLE 7

In the same manner as in Example 14 except that a cotton roll having a roll surface hardness of D95 was used as the backup roll, an embossed PVA film having an apparent film thickness of 140 μm (degree of embossing 3.5) and a crystallinity index of the emboss top of 1.05 was obtained and subjected to the same evaluation.

COMPARATIVE EXAMPLE 8

In the same manner as in Example 14 except that a rubber roll having a roll surface hardness of D95 was used as the backup roll, an embossed PVA film having an apparent film thickness of 130 μm (degree of embossing 3.3) and a crystallinity index of the emboss top of 0.98 was obtained and subjected to the same evaluation.

The properties of the embossed PVA films obtained in the above-mentioned Examples and Comparative Examples are shown in Table 1.

TABLE 1

| | PVA resin | | | | | embossed PVA film | | | | |
|---|---|---|---|---|---|---|---|---|---|---|
| | Viscosity in 4 wt % aqueous solution mPa.s (20° C.) | Saponification degree (mol %) | PVA film Moisture content (wt %) | backup roll Kind* | backup roll Surface hardness | Crystallinity index of emboss top | Degree of embossing | Resistance to blocking | Appearance | Resistance to pinhole |
| Ex. 1 | 22.5 | 88 | 10 | R | A80 | 0.67 | 2.3 | ○ | Δ | ○ |
| Ex. 2 | 22.5 | 88 | 10 | R | A85 | 0.73 | 2.7 | ○ | ○ | ○ |
| Ex. 3 | 23.6 | 93 | 10 | R | A75 | 0.77 | 2.7 | ○ | ○ | ○ |
| Ex. 4 | 10.2 | 88 | 10 | R | A75 | 0.62 | 2.5 | ○ | Δ | ○ |
| Com. Ex. 1 | 22.5 | 88 | 10 | R | A40 | 0.47 | 1.3 | X | Δ | ○ |
| Ex. 5 | 30 | 88 | 8 | C | D85 | 0.75 | 3.5 | ○ | ○ | Δ |
| Ex. 6 | 30 | 88 | 8 | C | D85 | 0.67 | 3.5 | ○ | ○ | Δ |
| Ex. 7 | 30 | 88 | 8 | C | D85 | 0.59 | 3.1 | ○ | ○ | Δ |
| Ex. 8 | 30 | 88 | 8 | C | D75 | 0.72 | 3.4 | ○ | ○ | Δ |
| Ex. 9 | 30 | 88 | 8 | C | D65 | 0.71 | 3.3 | ○ | ○ | Δ |
| Ex. 10 | 30 | 88 | 8 | C | D85 | 0.78 | 3.8 | ○ | ○ | Δ |
| Ex. 11 | 30 | 88 | 4 | C | D85 | 0.68 | 3.3 | ○ | ○ | Δ |
| Ex. 12 | 15 | 95 | 8 | C | D85 | 0.80 | 3.5 | ○ | ○ | Δ |
| Ex. 13 | 15 | 95 | 12 | C | D85 | 0.85 | 3.5 | ○ | ○ | Δ |
| Com. Ex. 2 | 30 | 88 | 3 | C | D85 | 0.40 | 3.5 | X | ○ | Δ |
| Com. Ex. 3 | 30 | 88 | 3 | C | D85 | 1.00 | 3.5 | ○ | X | X |
| Ex. 14 | 30 | 88 | 8 | R | A75 | 0.75 | 3.5 | ○ | ○ | ○ |
| Ex. 15 | 30 | 88 | 8 | R | A75 | 0.67 | 3.5 | ○ | ○ | ○ |
| Ex. 16 | 30 | 88 | 8 | R | A75 | 0.60 | 3.1 | ○ | ○ | ○ |
| Ex. 17 | 30 | 88 | 8 | R | A85 | 0.77 | 3.4 | ○ | ○ | ○ |
| Ex. 18 | 30 | 88 | 8 | R | A65 | 0.71 | 3.3 | ○ | ○ | ○ |
| Ex. 19 | 30 | 88 | 8 | R | A75 | 0.78 | 3.8 | ○ | ○ | ○ |
| Ex. 20 | 30 | 88 | 6 | R | A75 | 0.68 | 3.3 | ○ | ○ | ○ |
| Ex. 21 | 15 | 95 | 8 | R | A75 | 0.80 | 3.5 | ○ | ○ | ○ |
| Ex. 22 | 15 | 95 | 10 | R | A75 | 0.85 | 3.5 | ○ | ○ | ○ |
| Ex. 23 | 30 | 88 | 8 | C | D85 | 0.79 | 3.5 | ○ | ○ | Δ |
| Com. Ex. 4 | 30 | 88 | 3 | R | A75 | 0.40 | 3.5 | X | ○ | ○ |
| Com. Ex. 5 | 30 | 88 | 3 | R | A75 | 1.00 | 3.8 | ○ | X | X |
| Com. Ex. 6 | 30 | 88 | 8 | R | A40 | 0.42 | 1.6 | X | X | ○ |
| Com. Ex. 7 | 30 | 88 | 8 | C | D95 | 1.05 | 3.5 | ○ | ○ | X |
| Com. Ex. 8 | 30 | 88 | 8 | R | D95 | 0.98 | 3.3 | X | X | X |

*: R means a rubber roll and C means a cotton roll.

As shown in Table 1, the embossed PVA films having the crystallinity index of the emboss top within the range of 0.50–0.90 were almost free of pinholes, suppressed shining of the film, and were superior in resistance to blocking. In contrast, those having a crystallinity index of less than 0.50 easily suffered from blocking and had degraded appearance. When the crystallinity index exceeded 0.90, a number of pinholes were developed, and the appearance became poor. It is appreciated that the appearance, resistance to pinhole and resistance to blocking can be improved further by setting a degree of embossing to 1.5–5 and using a backup roll satisfying the conditions of a surface hardness (JIS K 6301) of A50-A95 and/or a surface hardness (JIS K 6253) of D60-D90. It follows therefrom that the appearance, resistance to blocking and resistance to pinhole of an embossed PVA film can be improved by setting the crystallinity index of the emboss top to fall within the above-mentioned range, and, to enhance the properties, the degree of embossing and the surface hardness of a backup roll should be set to fall within the above-mentioned range.

According to the present invention, the crystallinity index of the emboss top shows a specific value (0.50–0.90). Consequently, the obtained embossed PVA film is superior in the resistance to blocking even when preserved in a roll state, in appearance (no shining of the film surface and imparted impression of high quality), and in resistance to pinholes. This film is useful as a packaging material for agricultural chemicals, medicines, dyes, detergents, fertilizers, cosmetics, sanitary products and the like, particularly for unit packaging of various medicines and the like.

What is claimed is:

1. A method for producing an embossed poly (vinyl alcohol) film, which comprises embossing a poly(vinyl alcohol) film such that the crystallinity index of the emboss top is 0.50–0.90, wherein the embossing makes a ratio (T/t) of apparent thickness (T μm) of the film after embossing to the thickness (t μm) before embossing of 1.5–5, and wherein the poly(vinyl alcohol) film comprises a poly(vinyl alcohol) resin having a viscosity in a 4 wt % solution of 5–40 mPa·s (20° C.) and a saponification degree of 70–99 mol %.

2. The method of claim 1, wherein the poly(vinyl alcohol) film has a moisture content of 4–15 wt %.

3. The method of claim 1, wherein the embossing comprises passing the poly(vinyl alcohol) film between an emboss roll and a backup roll.

4. The method of claim 3, wherein the backup roll has a surface hardness (JIS K 6301) of A50-A95, which corresponds to Shore A, or a surface hardness of (JIS K 6253) of D60-D90, which corresponds to Shore D.

5. The method of claim 4, wherein the poly(vinyl alcohol) film has a moisture content of 4–15 wt %.

* * * * *